US010099566B2

United States Patent
Wu et al.

(10) Patent No.: US 10,099,566 B2
(45) Date of Patent: Oct. 16, 2018

(54) HANDS FREE VEHICLE CHARGING SYSTEM

(71) Applicant: Ford Global Technologies, LLC, Dearborn, MI (US)

(72) Inventors: Bo Wu, Northville, MI (US); Brittany Connolly, Canton, MI (US); Christopher W. Bell, Livonia, MI (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 14/511,644

(22) Filed: Oct. 10, 2014

(65) Prior Publication Data

US 2016/0101701 A1   Apr. 14, 2016

(51) Int. Cl.
*H02J 7/00* (2006.01)
*B60L 11/18* (2006.01)

(52) U.S. Cl.
CPC ......... *B60L 11/182* (2013.01); *Y02T 10/7005* (2013.01); *Y02T 10/92* (2013.01); *Y02T 90/125* (2013.01)

(58) Field of Classification Search
CPC ............... H02J 7/0054; H02J 7/025; H02J 50/00–50/90; B60L 11/182; B60L 11/1829; B60L 11/1831
USPC .................. 320/103, 108; 307/104
See application file for complete search history.

(56) References Cited

U.S. PATENT DOCUMENTS

| 5,498,948 | A | 3/1996 | Bruni et al. |
| 5,821,731 | A * | 10/1998 | Kuki ................... B60L 11/1805 320/108 |
| 7,860,614 | B1 * | 12/2010 | Reger ................... B25J 9/1671 700/10 |
| 7,999,506 | B1 | 8/2011 | Hollar et al. |
| 8,022,667 | B2 | 9/2011 | Anderson |
| 8,033,349 | B2 | 10/2011 | Ortmann et al. |
| 8,384,344 | B1 | 2/2013 | Rogers |
| 2006/0028169 | A1 * | 2/2006 | Winn ................... H02J 7/0044 320/107 |
| 2006/0229801 | A1 * | 10/2006 | Fink ..................... G05D 1/0246 701/117 |
| 2011/0221387 | A1 | 9/2011 | Steigerwald et al. |
| 2014/0067660 | A1 | 3/2014 | Cornish |

FOREIGN PATENT DOCUMENTS

JP         2001169470 A *   6/2001   ........... H02J 7/0054

* cited by examiner

*Primary Examiner* — Drew A Dunn
*Assistant Examiner* — Zixuan Zhou
(74) *Attorney, Agent, or Firm* — David B. Kelley; Brooks Kushman P.C.

(57) ABSTRACT

A vehicle charging system may include a drive system mounted to a chassis, a positionable electrical connector assembly, a position sensor, a proximity sensor, and a control module. The control module may be programmed to operate the drive system to place the chassis proximate a vehicle electrical connector and operate the positionable electrical connector assembly to releasably engage the vehicle electrical connector.

12 Claims, 4 Drawing Sheets

HANDS FREE VEHICLE CHARGING SYSTEM

TECHNICAL FIELD

This patent application relates to vehicle charging systems.

BACKGROUND

A plug-in vehicle may enable an operator to connect the vehicle to an external power source. The operator, for example, may manually connect and disconnect a charging cable to the vehicle for charging purposes. This arrangement may allow the operator to charge a battery of the vehicle at a number of geographic locations.

SUMMARY

A vehicle charging system includes a chassis supported by first and second tracks, a control module operably connected to the first and second tracks and a positioning system, and a first electrical connector associated with the positioning system. The vehicle charging system also includes a position sensor configured to provide a signal indicative of a position of a second electrical connector mounted on a vehicle, and a power source mounted on the chassis and associated with the first electrical connector and the control module. In response to the signal, the control module operates the first and second tracks and the positioning system to position the first electrical connector relative to the second electrical connector.

A vehicle charging system includes a drive system mounted to a chassis and configured to propel the chassis toward a vehicle, a positionable electrical connector assembly mounted to the chassis, and position and proximity sensors. The vehicle charging system also includes a control module programmed to operate the drive system to place the chassis proximate a vehicle electrical connector, and to operate the positionable electrical connector assembly to releasably engage the vehicle electrical connector.

A vehicle charge bot includes a drive system, a charge delivery arrangement associated with a positioning system and configured to releasably engage a charge receiver mounted to a vehicle, and a controller in communication with the drive system, the positioning system, and the charge delivery arrangement, and programmed to command the drive system to steer the charge bot toward the charge receiver and the positioning system to move the charge delivery arrangement toward the charge receiver based on position data of the vehicle.

DETAILED DESCRIPTION

Figure 1A:
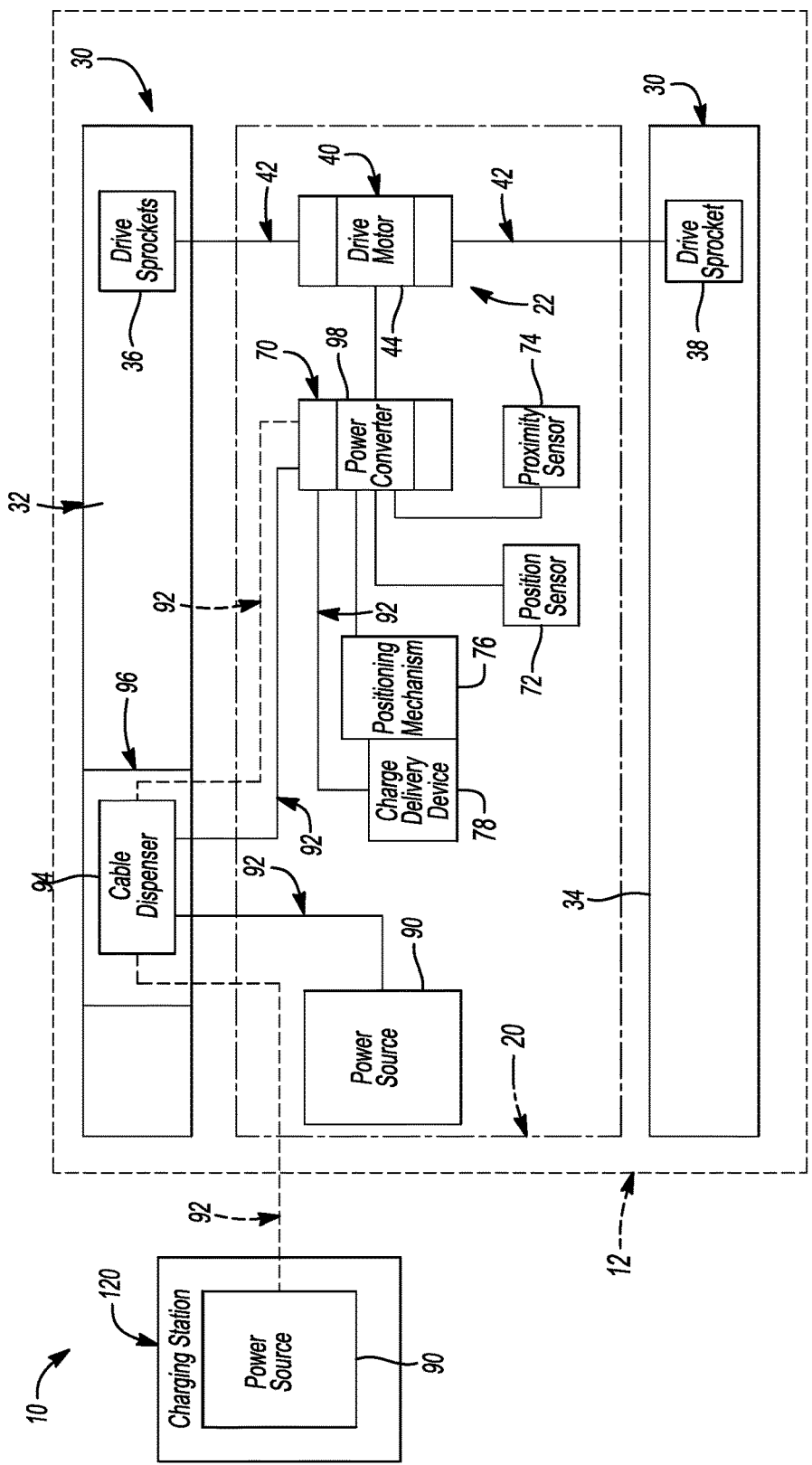
FIGS. 1A and 1B are schematics of exemplary embodiments of a vehicle charging system.

As required, detailed embodiments of the present disclosure are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Plug-in vehicles, including plug-in hybrid electric vehicles (PHEV) and battery electric vehicles (BEV), may include a vehicle traction battery configured to supply electric power to a traction motor. The traction battery, traction motor, and other components cooperate as an electric drive system. In a BEV, the electric drive system may be the only source of propulsive power to vehicle traction wheels, while a PHEV may additionally be provided with an internal combustion engine. Such vehicles may be connected to an external power supply to recharge the traction battery when the vehicle is parked.

For some plug-in vehicles, a vehicle operator may be required to exit the vehicle to connect the vehicle to an external power supply and charge the traction battery using a charging cable. The charging cable may be dirty or wet or inconveniently stowed within the vehicle or proximate the vehicle.

A hands-free vehicle charging system may be provided to connect the vehicle to the external power supply. The hands-free vehicle charging system may be an inductive charging system. The inductive charging system may include a charge receiver coil and charge delivery coil. To ensure efficient power transfer between the inductive charge receiver and the inductive charge delivery device, the devices must be accurately located relative to one another. Various prior art inductive charging systems may require the vehicle operator to spend a considerable amount of time in maneuvering the vehicle to accurately locate the wireless charge receiver relative to the wireless charge delivery device. A hands-free vehicle charging system according to various embodiments of the present disclosure may include a self-propelled chassis having a positionable charge delivery coil controlled by an associated microprocessor based controller to accurately align the charge delivery coil with the charge receiver on the vehicle to reduce or eliminate vehicle maneuvering by the operator.

The inductive charging systems, at present, have a power delivery capacity limited to 3.3 kW. While suitable for many applications, such as for PHEVs for example, the limited power delivery capacity may require a considerable amount of time to charge a long distance battery electric vehicle. As such, various embodiments include a conductive vehicle charging system. The conductive vehicle charging system embodiments may employ a self-locating conductive charger configured to move to engage a vehicle mounted charge receiving device.

Referring to FIG. 1A, an embodiment of a vehicle charging system 10 is provided. The vehicle charging system 10 may include a vehicle charge bot 12 having a chassis 20 connected to a drive system 22. The drive system 22 may be configured to support the chassis 20 by a suspension system (not shown) or by other conventional support means.

The drive system 22 may include a track assembly 30 having a first driven flexible track 32 and a second driven flexible track 34. The first driven flexible track 32 may be trained about a first drive wheel or drive sprocket 36. The second driven flexible track 34 may be trained about a second drive wheel or drive sprocket 38. The first and second drive sprockets 36, 38 may be operatively connected to a drive module 40 by drive axles 42 and driven by a drive motor 44.

Figure 1B:
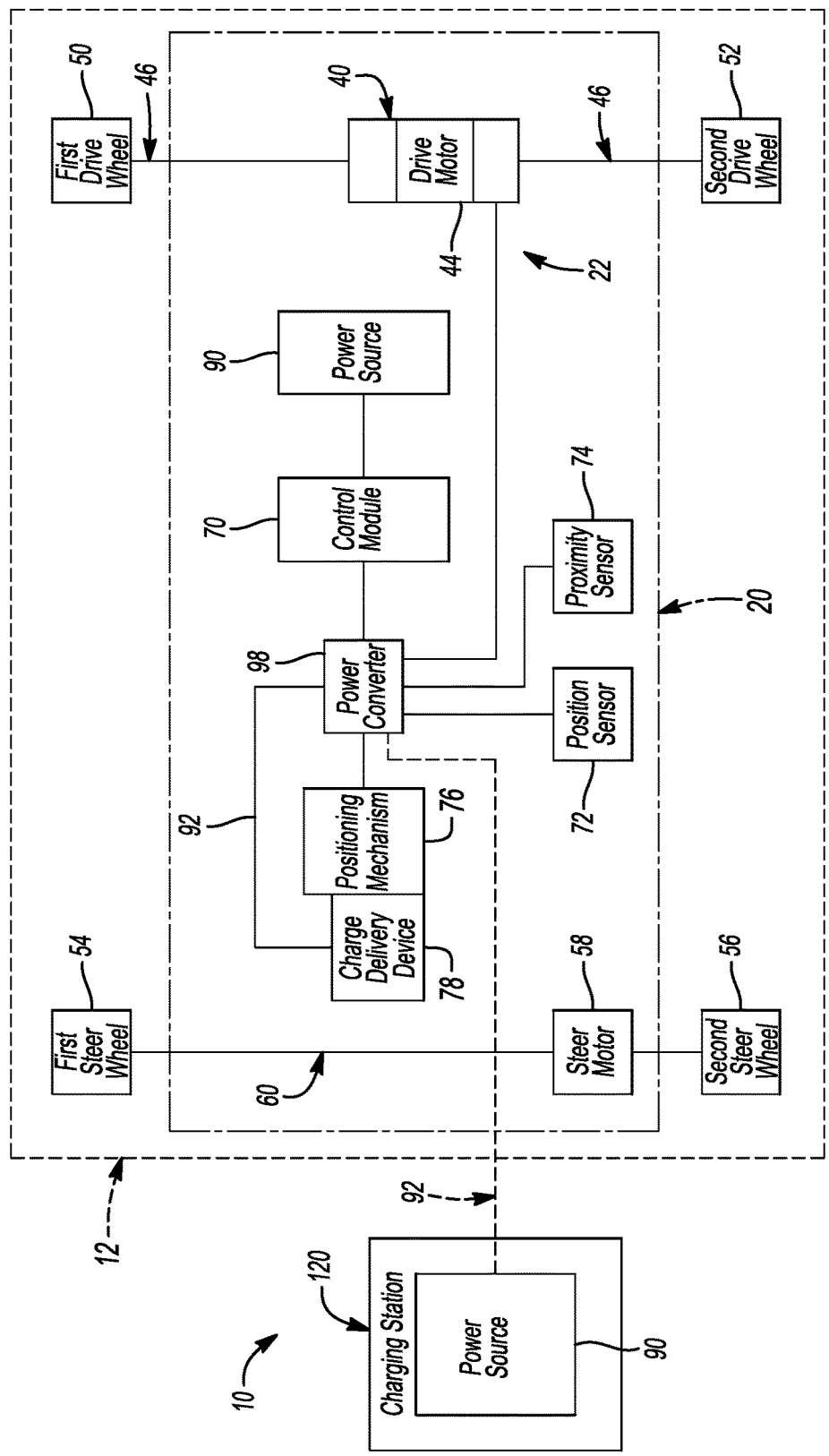

Referring to FIG. 1B, an alternative embodiment of a vehicle charging system 10, is provided. The drive system 22 may include a wheel assembly having a first drive wheel 50 and a second drive wheel 52. The first drive wheel 50 and the second drive wheel 52 may be operatively connected to the drive module 40 via the drive axles 42. The drive system 22 may further include a steering system having an axle 60 operatively connected to a first steer wheel 54 and a second steer wheel 56 to a steer motor 58. The steer motor 58 may be configured to articulate or pivot the first steer wheel 54 and the second steer wheel 56 about a kingpin axis or kingpin (not shown) to steer the vehicle charge bot 12.

The drive module 40 of the drive system 22 may be in communication with a control module 70. The drive module 40 may be integrated into the control module 70 or be provided as a separate component within the drive system 22. The control module 70 may be in communication with the drive system 22, a position sensor 72, a proximity sensor 74, a positioning mechanism 76, a charge delivery device 78, and a power supply or power source 90.

Figure 2:
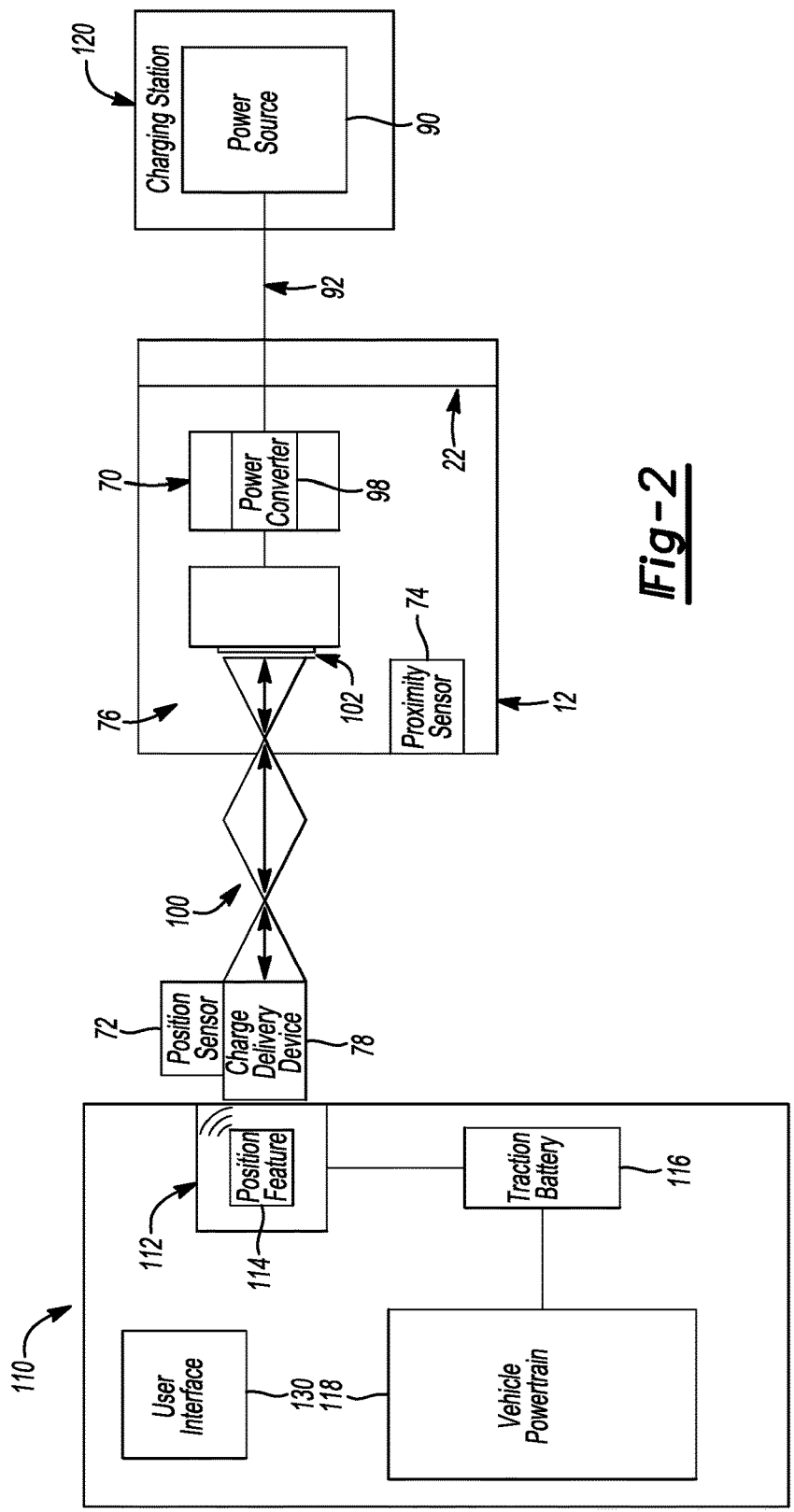
FIG. 2 is a schematic of a plug-in vehicle and an exemplary vehicle charging system.
Figure 3:
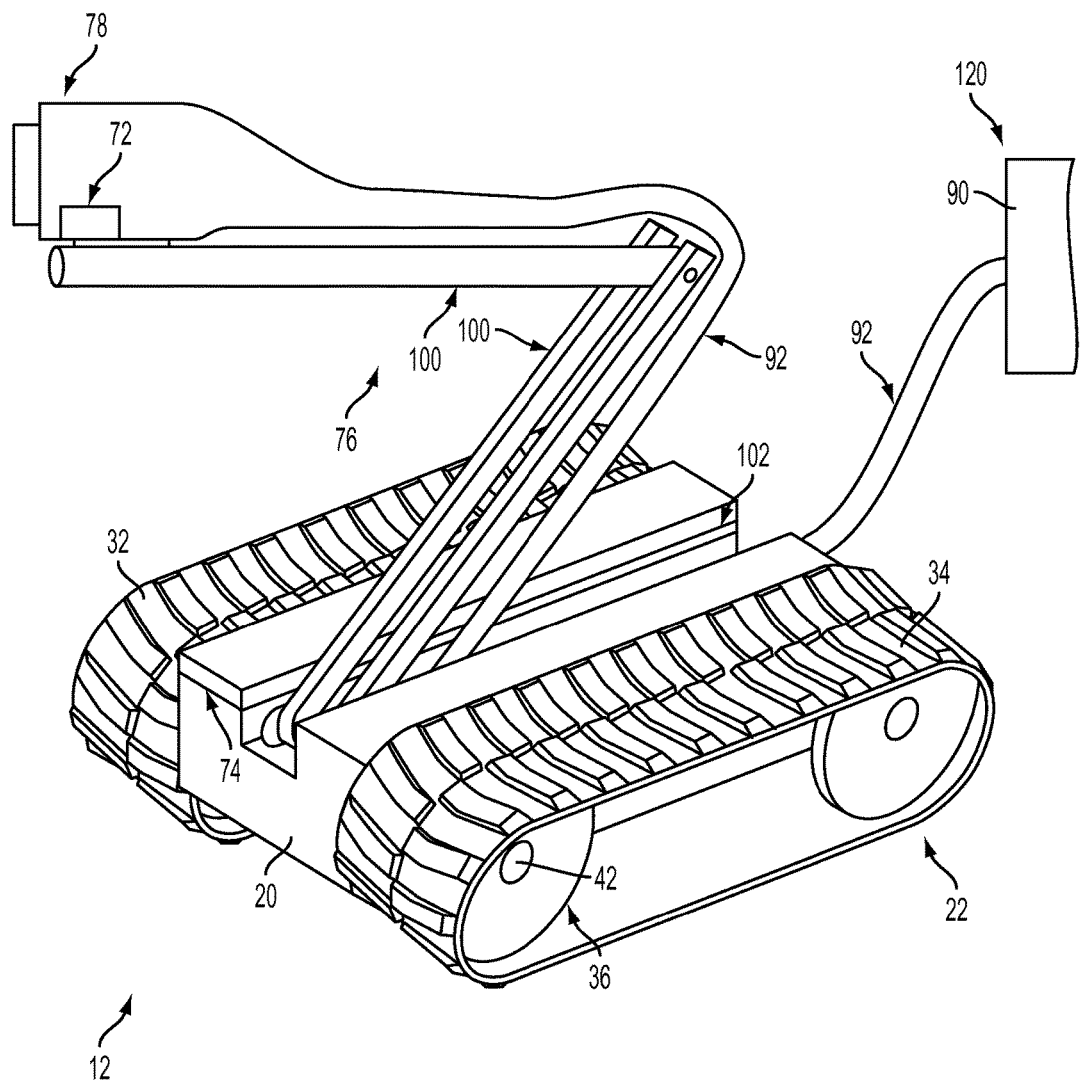
FIG. 3 is a perspective view of an exemplary embodiment of a vehicle charge bot.

Referring to FIGS. 2 and 3, responsive to signals provided by the position sensor 72 and the proximity sensor 74, the vehicle charge bot 12 may be configured to move toward a charge receiving device 112 disposed on a vehicle 110. The position sensor 72 may be configured to provide a signal to the control module 70, indicative of a position of a charge receiving device 112 disposed on a vehicle 110, relative to the chassis 20 of the vehicle charge bot 12. The position sensor 72 may be configured to monitor or detect the position of a position feature 114 disposed on or proximate the charge receiving device 112.

The position feature 114 may be an emitter configured to provide or emit a magnetic field, infrared waves, optical waves, or a radio frequency configured to be detected or received by the position sensor 72. The position sensor 72 may be provided with a magnetic field sensor, an infrared receiver, photodetector array, or radio receiver configured to receive the magnetic field, infrared waves, optical waves, or radio frequency emitted by the position feature 114.

The proximity sensor 74 may be configured to provide a signal to the control module 70, indicative of a potential obstruction proximate, but not contacting, the chassis 20 of vehicle charge bot 12. The proximity sensor 74 may include an infrared sensing arrangement or a sonar device.

The positioning mechanism 76 may be a positioning mechanism system (e.g., scissor lift, articulable arm, robotic arm, etc.) configured to raise and lower the charge delivery device 78 and adjust the yaw or pitch of the charge delivery device 78. The positioning mechanism 76 may be configured to adjust the position of the charge delivery device 78 along multiple axes.

The positioning mechanism 76 may be an articulable arm or a combination of a scissor lift mechanism 100 and a track 102 disposed on the chassis 20. The scissor lift mechanism 100 may translate upon the track 102 to position the charge delivery device 78 fore/aft or laterally. The combination of the positioning mechanism 76 and the charge delivery device 78 may be referred to as a positionable electrical connector assembly. For conductive charging system embodiments, charge delivery device 78 may include a standard plug or electrical connector as described below. For inductive charging system embodiments, charge delivery device 78 may include a primary or charging coil.

The charge delivery device 78 may be a charge delivery arrangement, such as a first electrical connector associated with the positioning mechanism 76. The charge receiving device 112 may be a charge receiver, such as a second electrical connector associated with the vehicle 110. The first and second electrical connectors may be configured to releasably engage each other.

The first and second electrical connectors may be any combination of electrical connectors configured to transfer power from a power source to a vehicle charge storage device (e.g., J1772 connectors, TEPCO connectors, IEC 62196 connectors, CHAdeMO connectors, VDE-AR-E 2623 connectors, G105 connectors, etc.) For inductive charging system embodiments, charge delivery device 78 may include a primary inductive coil while charge receiving device 112 may include a secondary inductive coil.

The charge delivery device 78 may be connected to the power source 90 via one or more electric cables 92 extending between the control module 70, the charge delivery device 78 and the power source 90.

In at least one embodiment, the power source 90 may be associated with the charge delivery device 78 and the power source 90 may be mounted on the chassis 20. The power source 90 may be a high voltage battery having the capacity to provide at least a partial charge to a traction battery 116 disposed on the vehicle 110.

In at least one embodiment, the power source 90 may be an external power source. The external power source may be a high-voltage power source such as a plug-in vehicle charging station 120, or the like.

In embodiments where the vehicle charge bot 12 is connected to an external power source 90 a cable dispenser 94 may be provided. The cable dispenser 94 may be configured to receive the electric cable 92 that may connect the charge delivery device 78 to the power source 90 through the control module 70. The cable dispenser 94 may be a spring loaded or actuated spool or reel.

The electric cable 92 may be wound about the cable dispenser 94 and the electric cable 92 may be guided by the cable dispenser 94 such that the cable dispenser 94 acts as a winch. The cable dispenser 94 may be operatively connected to the drive system 22, such that operation of the drive system 22 may actuate the cable dispenser 94 to lay or retrieve the electric cable 92.

In at least one embodiment, the track assembly 30 may include an electric cable housing 96 configured to receive the cable dispenser 94. The operation of the track assembly 30 may result in the rotation of a road wheel of the track assembly 30 or the first and second drive sprockets 36, 38 either of which may cooperate with the cable dispenser 94 to actuate the cable dispenser 94.

The actuation of the cable dispenser 94 by the road wheel or the first or second drive sprocket 36, 38 may result in the cable dispenser 94 dispensing the electric cable 92 as the vehicle charge bot 12 travels away from the charging station 120 and toward the vehicle. The operation of the track assembly 30 may actuate the cable dispenser 94 to retract or pull back the electric cable 92 to wind the electric cable 92 about the cable dispenser 94 as the vehicle charge bot 12 travels toward the charging station 120 and away from the vehicle.

A power converter 98 may be provided and disposed on the chassis 20. The power converter 98 may be integrated into the control module 70 or provided as a separate component, disposed on the chassis 20. The power converter 98 may be a step-down or step-up converter or transformer.

The power converter 98 may be configured to receive high-voltage power (e.g. 120V AC) from the power source 90 and provide high-voltage power (e.g. 120 V AC) to the charge delivery device 78. The power converter 98 may be configured to receive high-voltage power (e.g. 120V AC)

from the power source 90 and provide reduced power (e.g. 12 V DC) to the drive system 22, the drive module 40, the position sensor 72, and the proximity sensor 74. The power converter 98 may include a step down AC transformer to reduce the voltage and a rectifier to convert from AC to DC.

The control module 70 may receive a user request from a user interface 130, when the vehicle 110 is within a specific range of the vehicle charging system 10. The user interface 130 may be an application on a vehicle operator's remote device configured to interface with the vehicle 110 and the vehicle charge bot 12. The user interface 130 may be a human-machine-interface disposed within the vehicle 110.

The request from the user interface 130 may request that the vehicle charge bot 12 be deployed to initiate a vehicle charging process. In deploying the vehicle charge bot 12, the control module 70 may receive a plurality of signals to steer or maneuver the vehicle charge bot 12 toward the vehicle 110.

The control module 70 may receive a signal from the position sensor 72 indicative of a position of the vehicle upon which the charge receiving device 112 is disposed. The control module 70 may receive a signal from the proximity sensor 74 indicative of potential obstructions within the path of the vehicle charge bot 12. Based on the signals, the control module 70 may determine an initial direction or path of travel towards the vehicle.

The control module 70 may continuously or periodically receive signals from the position sensor 72 and the proximity sensor 74 during operation, to maintain or provide a corrected direction or path of travel of the vehicle charge bot 12. Responsive to the signals, the control module 70 may command that the drive system 22 to steer the vehicle charge bot 12 toward the charge receiving device 112.

In commanding the drive system 22 to steer the vehicle charge bot, the drive module 40 may operate the drive sprockets 36, 38 or drive wheels 50, 52. The operation of the drive sprockets 36, 38 may operate the first and second driven flexible tracks 32, 34.

Responsive to the signal indicative of a potential obstruction proximate the chassis 20, control module 70 may command that vehicle charge bot 12 to maneuver to avoid or traverse such obstructions by utilizing the drive module 40 to operate the steer motor 58 to steer the wheels or first and second driven flexible tracks 32, 34.

As the vehicle charge bot 12 approaches the vehicle 110 and in response to the signal indicative of the position of the charge receiving device 112, the control module 70 may command the positioning mechanism 76 to position or move the vehicle charge delivery device 78 towards the vehicle charge receiving device 112.

In response to the proximate alignment of the charge delivery device 78 and the charge receiving device 112, the control module 70 may command that the positioning mechanism 76 engage the charge delivery device 78 with the charge receiving device 112. The charge delivery device 78 may be proximately aligned with the charge receiving device 112 when the charge delivery device 78 is within a predetermined range of the charge receiving device 112. This predetermined range may be a hemispherical region in which the positioning mechanism 76 may manipulate the position of the charge delivery device 78 such that the charge delivery device 78 may releasably engage the charge receiving device 112.

In response to the releasable engagement of the charge delivery device 78 with the charge receiving device 112, the control module 70 may command that electric power be delivered from the power source 90 to a vehicle traction battery. The releasable engagement between the charge delivery device 78 and the charge receiving device 112 may be maintained while electric power is delivered to the vehicle traction battery to at least partially charge the vehicle traction battery.

The positioning mechanism 76 may disengage the charge delivery device 78 from the charge delivery device 112 in a variety of situations. For example, if the charging system detects a power loss from the power source 90, or an interruption in the connection between the charge delivery device 78 and the charge receiving device 112, control module 70 may command that the positioning mechanism 76 disengage the charge delivery device 78 from the charge receiving device 112. The positioning mechanism 76 may disengage the charge delivery device 78 from the charge receiving device 112 in response to a user initiated request to end the charging process.

The charge receiving device 112 may be connected to a traction battery 116 disposed within the vehicle 110. The charge receiving device 112 may be configured to provide electrical power to the traction battery 116 when the vehicle 110 is connected to the power source 90 via the vehicle charge bot 12. The traction battery 116 may be operably connected to a vehicle powertrain 118. The vehicle powertrain 118 may include an engine selectively coupled to an electric machine and a transmission or gearbox operatively coupled to the electric machine or engine.

The charge receiving device 112 may be disposed proximate an underside of the vehicle 110. The charge receiving device 112 may be disposed at other locations that may enable engagement of the charge delivery device 78 with the charge receiving device 112.

If the charge receiving device 112 is disposed on the underside of the vehicle 110, the charge receiving device 112 may be disposed above a scuff plane of the vehicle 110. The location of the charge receiving device 112 above the scuff plane may reduce the possibility of damage to the charge receiving device 112 if contact is made with the ground or foreign objects.

The charge receiving device 112 may be disposed within a housing implemented as a weather protection box configured as a shielding hood to protect the charge receiving device 112 and the position feature 114 from the elements. The charge receiving device 112 may be spring loaded to accommodate offset or over-run between the charge delivery device 78 and the charge receiving device 112. As the charge delivery device 78 approaches the housing, the housing may be opened to permit the releasable engagement of the charge delivery device 78 with the charge receiving device 112.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charging system comprising:
   a chassis supported by first and second tracks of a drive system;
   a positioning system;
   a first electrical connector associated with the positioning system, wherein the positioning system is configured to move the first electrical connector in vertical and horizontal planes relative to the chassis;

a position sensor configured to provide a signal indicative of a position of a second electrical connector mounted on a vehicle; and a power source mounted on the chassis, and associated with the first electrical connector and a control module, wherein in response to the signal, the control module operates the drive system to position the first electrical connector relative to the second electrical connector, and the positioning system but not the drive system to further position the first electrical connector in the vertical and horizontal planes relative to the second electrical connector and the chassis.

2. The vehicle charging system of claim 1 further comprising a proximity sensor configured to provide a signal indicative of an obstruction proximate the chassis.

3. The vehicle charging system of claim 1 wherein the power source is a battery having capacity to charge a vehicle traction battery.

4. The vehicle charging system of claim 3 wherein the control module is configured to deliver power from the battery to the first electrical connector and reduced power to a drive motor associated with the first and second tracks.

5. The vehicle charging system of claim 1 wherein the control module includes a drive module in communication with a drive motor configured to drive the first and second tracks.

6. The vehicle charging system of claim 5 wherein in response to a user request, the control module is further configured to maneuver the chassis toward the second electrical connector while avoiding obstructions as detected by a proximity sensor disposed on the chassis.

7. A charging system comprising:
a chassis carrying separate drive and positioning systems;
an electrical connector carried by the positioning system; and
a control module programmed to, responsive to sensor feedback, operate the drive system to position the electrical connector relative to a vehicle electrical connector, and operate the positioning system but not the drive system to further position the electrical connector in horizontal and vertical planes relative to the chassis and vehicle electrical connector.

8. The charging system of claim 7 wherein the drive system includes a flexible track disposed about a drive sprocket operatively connected to a drive motor.

9. The charging system of claim 7 wherein the drive system includes a drive wheel operatively connected to a drive motor.

10. The charging system of claim 7 further comprising a cable dispenser carried by the chassis, wherein the cable dispenser is configured to receive an electric cable for connection between the electrical connector and an external power source.

11. The charging system of claim 7 further comprising a power supply carried by the chassis and associated with the electrical connector, wherein the power supply is configured to provide at least a partial charge to a vehicle traction battery.

12. The charging system of claim 7 wherein the control module is further programmed to deliver power from a power source to the electrical connector and reduced power to the drive system.

* * * * *